United States Patent
Payen et al.

(10) Patent No.: US 8,980,402 B2
(45) Date of Patent: Mar. 17, 2015

(54) GLAZING WITH VERY LITTLE DOUBLE IMAGING

(75) Inventors: Corinne Payen, Montmacq (FR); Herve Thellier, Pimprez (FR); Jean-Luc Lesage, Compiegne (FR)

(73) Assignee: Saint-Gobain Glass France, Courbevoie (FR)

(*) Notice: Subject to any disclaimer, the term of this patent is extended or adjusted under 35 U.S.C. 154(b) by 665 days.

(21) Appl. No.: 13/321,884

(22) PCT Filed: May 19, 2010

(86) PCT No.: PCT/FR2010/050975
§ 371 (c)(1),
(2), (4) Date: Nov. 22, 2011

(87) PCT Pub. No.: WO2010/136702
PCT Pub. Date: Dec. 2, 2010

(65) Prior Publication Data
US 2012/0070624 A1 Mar. 22, 2012

(30) Foreign Application Priority Data
May 27, 2009 (FR) ..................... 09 53505

(51) Int. Cl.
*B32B 1/00* (2006.01)
*B32B 3/00* (2006.01)
(Continued)

(52) U.S. Cl.
CPC ........... *B60J 1/008* (2013.01); *B32B 17/10036* (2013.01); *B32B 17/10761* (2013.01); *C03B 23/023* (2013.01); *C03B 23/0252* (2013.01)
USPC ....... 428/174; 428/428; 296/84.1; 296/96.12; 65/106; 65/107

(58) Field of Classification Search
USPC ............ 428/174, 428; 65/106, 107; 296/84.1, 296/96.12
See application file for complete search history.

(56) References Cited

U.S. PATENT DOCUMENTS 5,178,659 A * 1/1993 Watanabe et al. ............... 65/106
6,158,247 A * 12/2000 Didelot .......................... 65/106
(Continued)

FOREIGN PATENT DOCUMENTS

FR          2 680 584      2/1993
WO       2004 103922     12/2004

OTHER PUBLICATIONS

International Search Report Issued Aug. 31, 2010 in PCT/FR10/050975 Filed May 19, 2010.
French Search Report Issued Jan. 15, 2010 in Patent Application No. 0953505 Filed May 27, 2009.

*Primary Examiner* — Donald J Loney
(74) *Attorney, Agent, or Firm* — Oblon, McClelland, Maier & Neustadt, L.L.P.

(57) ABSTRACT

The invention relates to a curved glass pane, made of float glass, the area of a main face of which is greater than 1.5 m² and the product of its two depths of bending is greater than 3000 mm², and such that its point located on the normal to its surface passing through its center of gravity has a radius of curvature of less than 3 m in any direction, the variation in its thickness in the longitudinal float direction being less than 10 µm over 500 mm. This pane may be assembled into laminated glazing of the automobile windshield type. Such a windshield has a very small amount of double imaging even when it is fitted into the vehicle so as to be close to the horizontal.

15 Claims, 2 Drawing Sheets

(51) Int. Cl.
*B60J 1/00* (2006.01)
*C03B 23/023* (2006.01)
*C03B 23/03* (2006.01)
*B32B 17/10* (2006.01)
*C03B 23/025* (2006.01)

(56) References Cited

U.S. PATENT DOCUMENTS 6,749,926 B1 * 6/2004 Yoshizawa .................... 428/174
2007/0026238 A1  2/2007 Chiappetta et al.

* cited by examiner

GLAZING WITH VERY LITTLE DOUBLE IMAGING

CROSS-REFERENCE TO RELATED APPLICATIONS

The present application is a 35 U.S.C. §371 national stage patent application of International patent application PCT/FR2010/050975, filed on May 19, 2010, the text of which is incorporated by reference, and claims the benefit of the filing date of French application no. 0953505, filed on May 27, 2009, the text of which is also incorporated by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF THE MATERIAL ON THE COMPACT DISC

Not Applicable.

BACKGROUND OF THE INVENTION

1. Field of the Invention

The invention relates to the field of glazing, especially automotive glazing, with very little double imaging.

2. Description of the Related Art Including Information Disclosed Under 37 CFR 1.97 and 1.98

Automotive glazing, especially of the windshield or rear window type, must have the smallest number of optical defects for both safety reasons and esthetic reasons. The vision of a driver must be as clear as possible and it is in particular unacceptable for the image that he perceives of the environment of the automobile to be a double image. Multiple imaging as perceived by the driver through the windshield is a known phenomenon stemming from multiple reflections at the air/glass interfaces. It is generally referred to as double imaging even though in theory other additional images exist, since these additional images are of very low intensity. An additional reflection is accompanied in fact by a substantial loss of intensity of the parasitic image, by a factor of the order of 100 relative to the intensity of the main image. The magnitude of the phenomenon increases with the angle of inclination of the glazing.

The theoretical amount of double imaging, which is expressed as a number in minutes by those skilled in the art, can be calculated by computer. This amount depends on many factors, such as the thickness of the panes constituting the windshield and on the local curvature, but also on the angle of viewing through the glazing. A distinction is made between the amount of vertical double imaging (the images appearing one above the other when a person is sitting in the vehicle) and the amount of horizontal double imaging (the images appear one beside the other when a person is sitting in the vehicle). The usual inclination of the windshield generates vertical double imaging, whereas in general there is no horizontal double imaging problem. The closer the glazing is to the horizontal on the motor vehicle (as for example in FIG. 3), the greater the amount of vertical double imaging. At the present time, the maximum acceptable amount of double imaging (in all directions) is considered to be 7 minutes, as this is deemed to be imperceptible by the human eye. It is the amount of vertical double imaging that is difficult to contain to within at most 7 minutes in the case of glazing which is highly inclined in the use position. The amount of double imaging may be measured using the target test technique or the collimation telescope test technique as described in Rule 43, Addition 42 of the E/ECE/324 or E/ECE/TRANS/505 agreement, relating to the adoption of uniform technical requirements applicable to wheeled vehicles, to equipment and to components that can be mounted or used on a wheeled vehicle, and the conditions for reciprocal recognition of homologations granted in accordance with these provisions.

Automobile manufacturers, especially French ones, seek to design ever more innovative models. In particular, the windshields designed may be very large, since sometimes they may even form part of the roof by going over the top of front passengers. These windshields are also increasingly inclined to the horizontal. Moreover, their curvatures must be very regular so as to merge into the general shape of the automobile.

In the context of developing such windshields, it has been discovered that the amount of vertical double imaging is greater than the theoretical amount of double imaging without knowing the reason why. The windshields in question have been produced by a gravity bending process, which theoretically should be very suitable for forming them. The amount of vertical double imaging was more than 50% greater than the theoretical amount of double imaging.

Many bending processes have already been described, such as gravity bending as in EP 0 448 447, EP 0 705 798 and WO 2004/103922, bending by running glass between conveying rollers as in WO 2004/033381 or WO 2005/047198, and bending by pressing glass against a solid mold, said pressing being carried out either using a frame, as in U.S. Pat. No. 5,974,836, WO 95/01938, WO 02/06170 or WO 2004/087590, or by suction as in WO 02/064519 or WO 2006/072721.

BRIEF SUMMARY OF THE INVENTION

The present invention is based on the discovery that such large glazing highly curved in all directions in the central zone exhibits a large amount of double imaging when it is produced by gravity bending, whereas it exhibits double imaging much closer to the theoretical amount when it is produced by pressing against a solid mold. Without these explanations limiting the scope of the invention, it seems that the gravity process produces a slight thinning of the glass pane in the central zone so that the two faces of the pane are not in fact strictly parallel but form a very slight prism. The variations in question are very small, around 40 to 50 μm, but this is sufficient for the double imaging to be magnified very perceptibly for the human eye, especially when the windshield is highly inclined. This drawback stems from the combination of the following factors: high curvatures in all directions; large size; use of a gravity process that in particular entails higher bending temperatures. The high angle of inclination of the glazing on the motor vehicle further accentuates the phenomenon.

It is also necessary to take into consideration the fact that the variation in thickness of the initial flat glass (float glass, manufactured by floating the glass on molten metal) has an influence on the thickness variation of the bent glass. Float glass generally has a larger thickness variation in the transverse direction than in the longitudinal direction. The longitudinal direction of float glass corresponds to the direction in which the glass runs through the float glass plant. The transverse and longitudinal directions of a float glass are very easily identified using a shadowgraph technique by virtue of lines corresponding to the longitudinal direction. Thus, a float glass is perfectly identifiable by these lines and by the fact that one of its faces is enriched with tin. In the context of the present invention, a float glass having a thickness variation of less than 50 μm for 500 mm in the transverse direction and less than 2 μm for 500 mm in the longitudinal direction is used before bending. For optical transmission quality reasons, the glazing is generally placed on the motor vehicle so that the transverse direction of the glass corresponds to the horizontal.

By virtue of the invention, the thickness variation of a pane of float glass bent in the longitudinal direction can be reduced to less than 10 μm over 500 mm and even less than 7 μm over 500 mm, thereby reducing the amount of double imaging in the vertical direction (or longitudinal direction relative to the float direction) to at most 7 minutes with a 20° viewing angle (i.e. the angle between the horizontal and a longitudinal chord passing through the middle of two transverse bands).

The thicknesses (and therefore the thickness variations) may be measured using a micrometer or a contactless sensor, especially a confocal optical sensor. This applies both for individual glass panes and for the assembled glazing.

DETAILED DESCRIPTION OF THE INVENTION

Figure 1A:
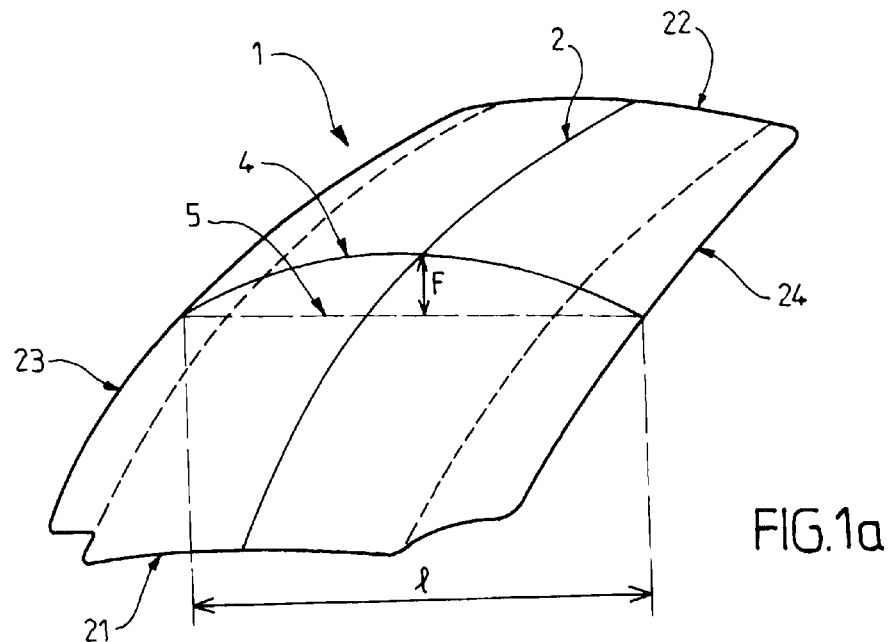
FIG. 1a: Illustrates the sag (F) and the width (l) of a glazing (1) in the position in which it is fitted into a motor vehicle.

The glazing according to the invention is curved along two mutually orthogonal directions and therefore has two depths of bending. A person skilled in the art of automotive glazing terms the largest depth of transverse bending (relative to the motor vehicle) the "sag" and terms the largest depth of longitudinal bending (relative to the motor vehicle) the "second depth of bending".

The glazing, especially of the automobile windshield type, generally comprises overall four sides or "bands".

The glazing to which the present invention relates is large, its width generally being greater than 1.10 m and its length generally being greater than 1.10 m or even greater than 1.3 m. In addition, it has the following characteristics (as does each glass pane from which it is made):
  a) its area (of one of its main faces) is greater than 1.5 m$^2$ and may even be greater than 1.6 m$^2$ or even greater than 1.8 m$^2$;
  b) the product of its two depths of bending is greater than 3000 mm$^2$ and may even exceed 5000 mm$^2$ or even 8000 mm$^2$; and
  c) the point on the glazing located on the normal to its surface and passing through its center of gravity has a radius of curvature of less than 3 m and even less than 2.5 m in any direction.

Condition a) above means that the glazing is large both in width and in length. Condition b) means that the glazing is highly curved in all directions. Condition c) means that the glazing is highly and uniformly curved in all directions in a central region essential for vision. This is because a glazing assembly may have a high sag and high counter-bending without its curvature being too pronounced in the central region, as shown in FIG. 2a). This type of shape is quite common and easy to obtain by gravity forming. The sagging of the region close to the edges is called the "bath effect" by those skilled in the art. The central region is only slightly curved. This type of shape is considered today to be somewhat unattractive. It is known to avoid this bath effect in a gravity process by providing an internal zone support as taught in WO 2004/103922.

Thus, the invention firstly relates to a curved glass pane, made of float glass, the area of a main face of which is greater than 1.5 m$^2$ and the product of its two depths of bending is greater than 3000 mm$^2$, and such that its point located on the normal to its surface, said normal passing through its center of gravity, has a radius of curvature of less than 3 m in any direction, the variation in its thickness in the longitudinal float direction being less than 10 μm over 500 mm and preferably less than 7 μm over 500 mm.

In general, the area of a main face of the glass pane is less than 3 m$^2$.

The product of its two depths of bending may be greater than 6000 mm$^2$ but is generally less than 150 000 mm$^2$.

The point on the glazing located on the normal to its surface, said normal passing through its center of gravity, may have a radius of curvature of less than 2 m in any direction and is generally greater than 1 m.

According to the invention, the large glazing pane according to the invention is bent by forming it on a solid bending mold, it being possible for the force with which the glass is pressed against said mold to be of mechanical or pneumatic nature. If the force is of mechanical nature, it may be applied by a solid or frame-shaped counter-mold. In particular, it may be a frame as shown by reference (4) in FIG. 1 of WO 95/01938 or the segmented frame referenced (9, 10, 11, 12) in FIGS. 1 and 2 of U.S. Pat. No. 5,974,836. If the force is of pneumatic nature, it may be applied by suction through the solid mold by virtue of holes in the surface with which the glass is in contact with said solid mold, as shown in FIG. 2 of WO 2006/072721. A pneumatic force may also be applied by means of a skirt surrounding the solid mold as in the model of the skirt referenced 16 in FIG. 2 of WO 04/087590. The skirt provides a suction force that generates a flow of air surrounding the pane, passing over its edge. However, the pneumatic force exerted by a skirt is generally insufficient and is preferably supplemented with a mechanical or pneumatic force through the solid mold.

The bending against a solid mold takes place at least at the end of bending, that is to say just before cooling. This bending against a solid mold is therefore followed directly (that is to say without a particular additional bending step) by a cooling step, generally natural cooling, generally placed on a frame.

This bending against the solid mold gives the glazing at least 50% of each of the two final depths of bending, or even at least 60% of each of the two final depths of bending. These two depths of bending correspond to the sag and to the second depth of bending as already explained. In general, these two depths of bending correspond to mutually orthogonal bending directions and one of these two depths is the largest depth of bending of the pane.

The forming against a solid mold may be preceded by bending using another process, especially and preferably by gravity bending. The existence of gravity prebending is even preferred as it makes it possible in the end to increase the complexity of the glazing (larger depths of bending in all directions), without degrading the optical quality. This gravity bending is carried out on a support of the frame or skeleton type, especially of the double skeleton type (see EP 0 448 447, EP 0 705 798 and WO 2004/103922). This preliminary bending (or prebending) gives the glazing less than 50% of each of the two final depths of bending or even less than 40% of each of the two final depths of bending.

The bending against a solid mold is preferably carried out in such a way that the glass, at the point located on the normal to its surface passing through its center of gravity, is at a temperature between 590 and 615° C.

The optional preliminary gravity bending is preferably carried out in such a way that the glass, at the point located on the normal to its surface passing through its center of gravity, is at a temperature between 610 and 640° C.

For all the bending steps, the various glass panes intended to be assembled into the same final laminated glazing (generally there are two panes) are generally superposed and bent together simultaneously. An interlayer powder is placed between the various panes, as is known to those skilled in the art, in order to minimize their tendency to stick together.

It is considered that the point on the laminated glazing located on the normal to its surface, said normal passing through the center of gravity of said glazing, is substantially at the same place as the point on each of the panes of the glazing located on the normal to the surface of each pane and passing through the center of gravity of said pane.

The thickness variation of each curved glass pane according to the invention is less than 10 µm, preferably less than 7 µm and even less than 3 µm over 500 mm in the longitudinal float direction. This thickness variation is the difference between the largest thickness and the smallest thickness of the pane over a distance of 500 mm on the surface in the longitudinal direction. Before bending, the glass pane is flat and has a thickness variation of less than 2 µm over 500 mm in the longitudinal float direction.

The glass pane generally has a thickness ranging from 1 to 4 mm and more generally from 1.1 to 2.8 mm.

The sheet of polymer (generally polyvinyl butyral or PVB) inserted between two glass panes within the laminated glazing generally has a thickness ranging from 0.3 to 1.6 mm.

The glass panes are assembled into laminated glazing in such a way that the float directions (or orientations) of the panes are mutually concordant. Thus, the invention also relates to laminated glazing comprising several curved panes according to the invention (generally two panes), said glazing having a measured level of double imaging:
through the point on its surface located on the normal to its surface passing through its center of gravity and
at a viewing angle of 20°,
of at most 7 minutes. This glazing is intended for fitting into all kinds of vehicle and especially motor vehicles. The transverse float direction of the glass panes assembled in the glazing corresponds to the horizontal in the case of the vehicle.

Figure 2:
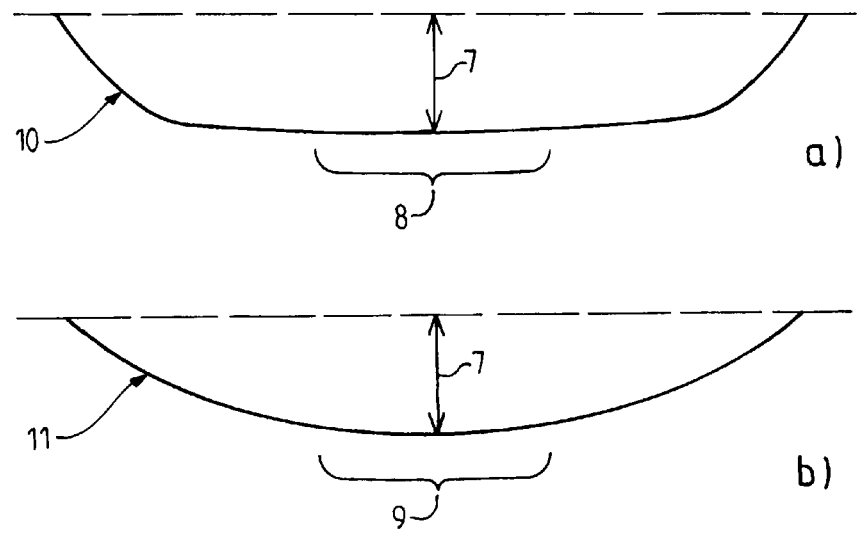
FIG. 2: Compares two glazing assemblies having the same depth of bending (7) while being very different in terms of curvature in the central regions (8) and (9), respectively.

FIG. 1a) illustrates what is meant by the sag F and the width l of glazing 1 in the position in which it is fitted into a motor vehicle. The sag F, i.e. the largest depth of transverse bending, is the length of the largest segment having as ends the middle of a transverse arc 4 and the middle of the chord 5 corresponding thereto, said chord here being the width l of the glazing. This glazing has overall four bands (or sides), two transverse bands 21 and 22 and two longitudinal bands 23 and 24.

Figure 1B:
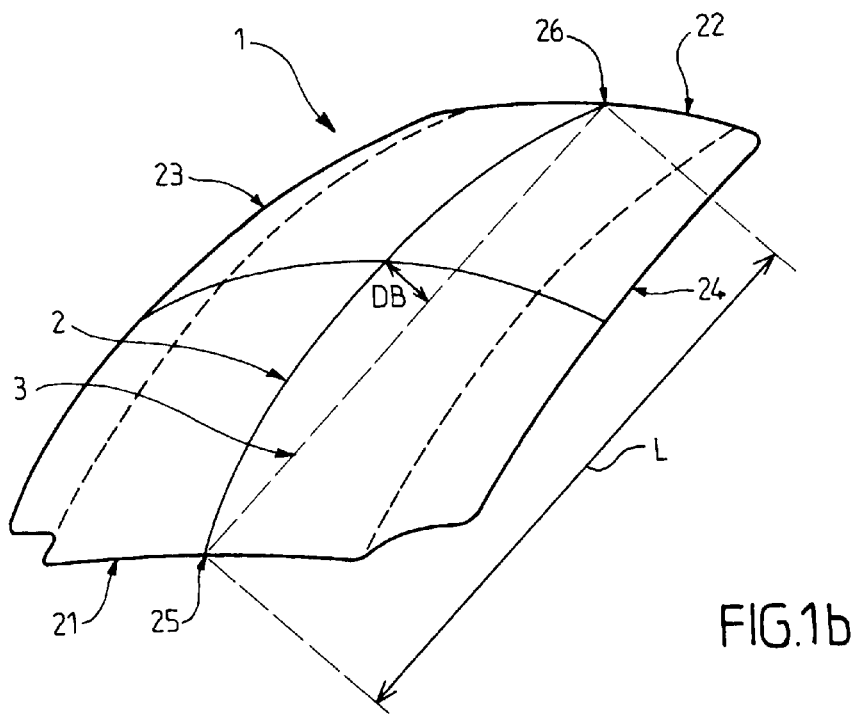
FIG. 1b: Illustrates the second depth of bending (DB) and the length (L) of a glazing 1.

FIG. 1b) illustrates what is meant by the second depth of bending DB and the length L of a glazing 1. The second depth of bending DB, i.e. the largest depth of longitudinal bending, is the length of the largest distance between a point on a longitudinal arc 2 (passing through the middles of the two transverse bands 21 and 22) and the chord 3 corresponding thereto (this chord is also here the length L of the glazing). The transverse bands 21 and 22 have middles 25 and 26 respectively.

FIG. 2 compares two glazing assemblies having the same depth of bending 7 while being very different in terms of curvature in the central region 8 and 9 respectively. The glazing assembly 10 of FIG. 2a) is quite flat in the central region 8, whereas the glazing assembly 11 of FIG. 2b) is more curved in the central region 9, this going hand in hand with a more harmonious shape, better wiping quality and being better suited to the general shape of current automobiles.

Figure 3:
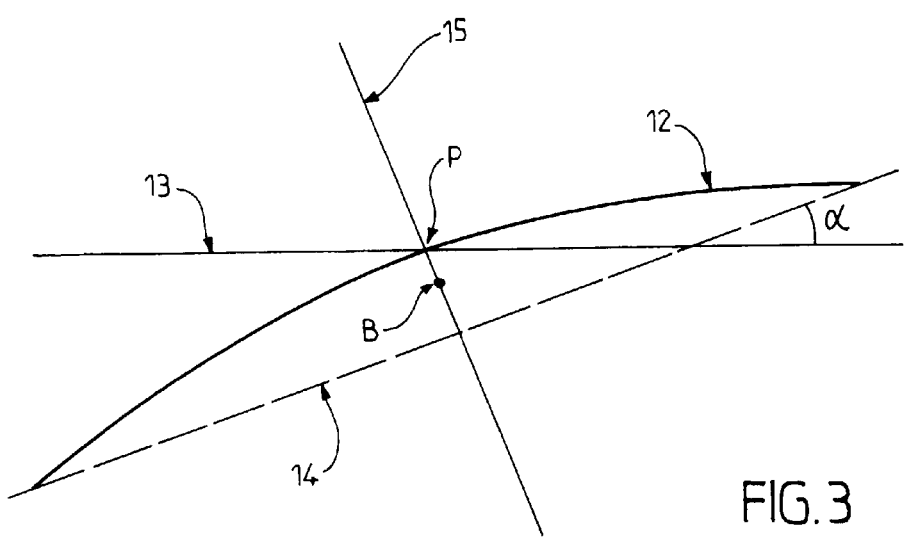
FIG. 3: Shows a glazing assembly (12) as fitted into a motor vehicle in cross section through its longitudinal arc passing in its vertical plane of symmetry, and the angle α of 20° below which the amount of vertical double imaging is measured.

FIG. 3 shows a glazing assembly 12 as fitted into a motor vehicle in cross section through its longitudinal arc passing in its vertical plane of symmetry (this is the arc 2 of FIG. 1b) passing through the middles 25 and 26 of the two transverse bands 21 and 22), and the angle α of 20° (viewing angle) below which the amount of vertical double imaging is measured. The amount of vertical double imaging is measured at an angle α of 20° between the horizontal line 13 and the chord 14 of the longitudinal arc passing through the middle of the transverse bands (this is the chord 3 in FIG. 1b), which passes through the middles 25 and 26 of the transverse bands 21 and 22). The horizontal line 13 corresponds substantially to the viewing direction of passengers in the motor vehicle.

EXAMPLES

Identical windshields were manufactured from batches of identical float glass panes but by using two different bending processes. Two versions were manufactured: one was very large (called "TG") and the other was of more normal size (called "N"). The dimensions of these windshields were the following:
very large windshield (TG):
length L: 1.48 m;
width l: 1.4 m (horizontal when the windshield is fitted into the automobile);
L×l: 2.072 m$^2$;
sag F: 103 mm;
second depth of bending DB: 105 mm;
F×DB: 10815 mm$^2$;
largest radius of curvature at the point P located on the normal to the surface passing through the center of gravity: 1500 mm.
Normal windshield (N):
length L: 1.1 m;
width l: 1.2 m (horizontal when the windshield is fitted into the automobile);
L×l: 1.32 m$^2$;
sag F: 80 mm;
second depth of bending DB: 25 mm;
F×DB: 2000 mm$^2$;
largest radius of curvature at the point P located on the normal to the surface passing through the center of gravity: 3500 mm.

The windshields were laminated and comprised two glass panes each 2.1 mm in thickness separated by a sheet of PVB 0.76 mm in thickness. In both cases, the two glass panes were bent together, by being superposed.

The glazing N was formed by conventional gravity bending using a double-skeleton of the type described in FIG. 3 of WO 04/103922. For Comparative Example 2, the windshield G was formed by gravity bending using a multi-support skeleton, including an internal zone support so as to avoid any bath effect, on the principle shown in FIG. 9 of WO 04/103922. For Comparative Example 3, the windshield TG was firstly formed by gravity bending using a single skeleton at a temperature of 620° C. until a sag representing 30% of the final sag was obtained and until a second depth of bending representing 50% of the final second depth of bending was obtained. The glazing thus prebent was then subjected to a forming operation by pressing it against a solid mold on the principle of the process shown in FIG. 2 of WO 04/087590 at 600° C.

The thickness variation of each glass pane was measured before assembly using a confocal optical sensor.

Two glass panes were then joined together as laminated glazing with an intermediate PVB sheet in a manner known to those skilled in the art.

The amount of double imaging was measured on the laminated glazing at point P located on the normal to the surface passing through the center of gravity of the glazing, with a viewing angle α of 20° between the horizontal and the longitudinal chord joining the two points of the glazing at mid-distance of the two transverse bands. The amount of double imaging was measured using the target test technique or the collimation telescope test technique as described in the ECE R43 regulation.

Table 1 gives the results. The temperatures indicated in this table are those of each glass pane at the point P located on the normal to the surface passing through the center of gravity.

TABLE 1

| Example | 1 (comparative example) | 2 (comparative example) | 3 |
|---|---|---|---|
| Windshield size | N | TG | TG |
| Bending type | Gravity | Gravity | Gravity then pressing |
| Glass temperature at the end of bending | 632° C. | 632° C. | 590° C. |
| Thickness variation of each glass pane in the longitudinal direction over 500 mm | 6 μm | 15 μm | 5.6 μm |
| Amount of vertical double imaging of the laminated glazing at an angle of 20° | 7 min | 10 min | 6 min |

The invention claimed is:

1. A curved glass pane, comprising float glass, which is curved in a transverse float direction and a longitudinal float direction, the transverse and longitudinal float directions being mutually orthogonal, wherein:
    the curved glass plane has a main face area greater than 1.5 m$^2$;
    a product of a largest depth of transverse bending and a largest depth of longitudinal bending of the curved glass pane is greater than 3000 mm$^2$;
    a point located on the normal to a surface passing through the center of gravity of the glass pane has a radius of curvature of less than 3 m in any direction; and
    a variation in the thickness of the glass pane in the longitudinal float direction is less than 10 μm over 500 mm.

2. The pane of claim 1, wherein the variation in the thickness is less than 7 μm over 500 mm in the longitudinal float direction.

3. The pane of claim 1, wherein the area of a main face is greater than 1.8 m$^2$.

4. The pane of claim 1, wherein
    the product of the largest depth of transverse bending and the largest depth of longitudinal bending is greater than 6000 mm$^2$, and
    the point located on the normal to a surface passing through the center of gravity has a radius of curvature of less than 2 m in any direction.

5. The pane of claim 1, wherein a thickness of the glass pane ranges from 1.1 to 2.8 mm.

6. A laminated glazing assembly, comprising at least two glass panes of claim 1, wherein the transverse and longitudinal directions of the at least two glass panes are mutually concordant.

7. The glazing assembly of claim 6, wherein a measured level of double imaging: through the point on the normal to a surface passing through the center of gravity; and at a viewing angle of 20°, is at most 7 minutes.

8. A windshield, comprising the glazing of claim 7.

9. A motor vehicle, comprising the windshield of claim 8, wherein a transverse float direction is horizontal.

10. A process for manufacturing the curved glass pane of claim 1, the process comprising bending a pane against a solid mold to give the pane at least 50% of each of the two depths of bending.

11. The process of claim 10, wherein a temperature of the pane at the point located on the normal to a surface passing through the center of gravity is between 590 and 615° C. during the bending.

12. The process of claim 11, further comprising cooling directly after the bending.

13. The process of claim 10, further comprising a gravity bending before the bending of the pane against the solid mold.

14. The process of claim 13, wherein, during the gravity bending, a temperature of the pane at the point located on the normal to a surface passing through the center of gravity is between 610 and 640° C.

15. The process of claim 10, wherein at least two superposed glass panes are bent simultaneously.

* * * * *